US005744751A

United States Patent [19]

Kasai

[11] Patent Number: 5,744,751

[45] Date of Patent: Apr. 28, 1998

[54] ELECTRIC JUNCTION BOX AND METHOD FOR ASSEMBLING SAME WITH BUS BAR

[75] Inventor: Koji Kasai, Yokkaichi, Japan

[73] Assignee: Sumitomo Wiring Systems, Ltd., Mie, Japan

[21] Appl. No.: 794,539

[22] Filed: Feb. 3, 1997

[30] Foreign Application Priority Data

Jun. 27, 1996 [JP] Japan ........................................ 8-167956

[51] Int. Cl.$^{6}$ ........................................ H02G 5/02

[52] U.S. Cl. ........................................ 174/52.1; 439/949

[58] Field of Search ........................................ 174/52.1, 50, 68.2, 174/72 B, 99 B, 133 B; D13/133; 439/76.2, 76.1, 212, 949

[56] References Cited

U.S. PATENT DOCUMENTS

| | | | |
|---|---|---|---|
| 3,018,320 | 1/1962 | Rowe | 174/99 B |
| 3,391,384 | 7/1968 | Hughes | 439/76.1 |
| 4,857,002 | 8/1989 | Jensen et al. | 439/76.1 |
| 4,871,884 | 10/1989 | Hayashi | 174/52.1 |
| 4,916,574 | 4/1990 | Hancock et al. | 439/212 X |
| 4,993,956 | 2/1991 | Pickles et al. | 439/76.1 |
| 5,011,417 | 4/1991 | Matsumoto et al. | 439/76 |
| 5,274,194 | 12/1993 | Belcher | 174/50 |
| 5,624,280 | 4/1997 | Kato | 439/212 X |

FOREIGN PATENT DOCUMENTS

| | | |
|---|---|---|
| 2 294 496 | 5/1996 | United Kingdom . |

*Primary Examiner*—Kristine L. Kincaid
*Assistant Examiner*—Dean A. Reichard
*Attorney, Agent, or Firm*—Oliff & Berridge, PLC

[57] ABSTRACT

To prevent an incorporated bus bar laminate from being subjected to an excessive pressure when a case is locked, lock fitting is carried out by interfitting an upper case and a lower case in an electric junction box which incorporates a bus bar laminate between holding faces provided on the upper case and the lower case opposite to each other. Seatings protrude in opposite direction from the inside of either or both cases, setting a protruded dimension from the holding surface of the seating to be slightly larger than a thickness of the bus bar laminate and almost equal to a dimension between the holding surfaces. The seating contacts an opposite holding surface, and the case is thus not forced to move in a pressing direction against the bus bar laminate.

14 Claims, 6 Drawing Sheets

ELECTRIC JUNCTION BOX AND METHOD FOR ASSEMBLING SAME WITH BUS BAR

BACKGROUND OF THE INVENTION

1. Field of the Invention

The present invention relates to an electric junction box, and, more specifically, to an electric junction box that prevents generation of deformation or damages of a bus bar laminate incorporated in a case when the case is pressed down for lock connection.

2. Description of the Related Art

An electric junction box is used for branch connection of an automobile wire harness with various electrical equipment. For instance, a joint box J/B, as shown in FIGS. 9 and 10, connects and locks a connecting hole 2*a* with an external surrounding wall of an upper case 2 onto a connecting claw 1*a* of the external surrounding wall of a lower case 1 by covering the upper case 2 onto the lower case 1.

Inside the lower case 1 and the upper case 2, a bus bar laminate 3 (which includes a bus bar laminated to an isolated board) is held between a holding surface 2*b* of the upper case 2 and a holding surface 1*b* of the lower case 1. The distance T between the holding surfaces 1*b* and 2*b* is set to a thickness t1 of the bus bar laminate 3.

However, when connecting and locking a connecting hole 2*a* of the upper case 2 with a connecting claw 1*a* on the lower case 1, and when inserting the upper case 2 in a covering direction due to connecting claw 1*a* and connecting hole 1*a* being locked, because a length h2 is larger than the height h1 of the connecting claw 1*a*, a useless load may be added to the bus bar laminate 3 which is directly pressed down by the holding surface 2*b* on the upper case 2 with a length wider than the length h2 of connecting hole 2*a*. In such a case, since there may be deformation of the bus bar (bending of the circuit, buckling of the terminal, etc.) and damages of the base material, etc., problems occurred that degraded the quality with a proportional increase of defective units during production and assembling.

SUMMARY OF THE INVENTION

The present invention was made to solve the above-mentioned problem, and one purpose of the present invention is to provide an electric junction box that prevents generation of deformation or damages of the incorporated bus bar laminate.

According to one aspect of the present invention, there is provided an electric junction box which incorporates a bus bar laminate between opposed holding surfaces provided on an upper case and a lower case by interfitting the upper case and lower case and performing lock fitting. A seating protrudes from at least one inner surface of at least one of the cases. A protruded dimension from a holding surface of each seating is set slightly larger than the thickness of bus bar laminate and is also set to almost an equal dimension between the opposed holding surfaces, and the case is restricted so that it does not move in a direction to press on the bus bar laminate by making the seating connect with the opposite holding surface.

At least one of the upper and lower cases, for instance, when covering the lower case on the upper case and the upper case is pressed down on the lower case for locking a connecting claw and a connecting hole, is provided with a seating protruding from the inside surface of upper case to restrict the insertion of the upper case by contacting the holding surface of the lower case. Because the seating protrudes slightly more than a thickness of the bus bar laminate from the holding surface on the upper case, a dimension between the holding surfaces of the upper case and the lower case will not become less than the bus bar laminate. Therefore, the bus bar laminate will not be pressed down and/or deformed by the pressing of the upper case.

It is preferable to provide the seating near the connecting claw and the connecting hole. In such a way, if the seating is provided near the locked area, a force is primarily given to an area near the lock of the case when lock fixing, but excessive pressing can surely be prevented by the seating.

It is preferable to provide a seating at least on four corners of the case. In such a way, providing seating on four corners of the case can prevent excessive pressing when carrying out forceful insertion on four corners of the case.

The seating can be commonly used together with a rib for preventing deflected opening of the external surrounding wall on the other case. With this structure, it is not necessary to provide an additional seating.

According to another aspect of the present invention, there is provided an electric junction box comprising a lower case having a lower holding surface, an upper case attachable to the lower case using a predetermined force, the said upper case having an upper holding surface, a bus bar laminate positioned between the upper holding surface and the lower holding surface, and structure for maintaining a predetermined distance no less than a thickness of the bus bar laminate between the upper holding surface and the lower holding surface despite application of the predetermined force.

According to still another aspect of the present invention, there is provided a method for assembling a junction box incorporating a bus bar laminate. The method comprises inserting a bus bar laminate between an upper case and a lower case of the junction box, pressing the upper and lower cases together using a predetermined force to sandwich the bus bar laminate, maintaining a predetermined distance between an upper surface of the upper case and a lower surface of the lower case that is no less than a thickness of the bus bar laminate.

These and other salient features of the invention will become apparent from or described with reference to the following detailed description of preferred embodiments.

BRIEF DESCRIPTION OF THE DRAWINGS

The invention will be described in detail with reference to the following drawings in which.

DESCRIPTION OF PREFERRED EMBODIMENTS

Figure 1:
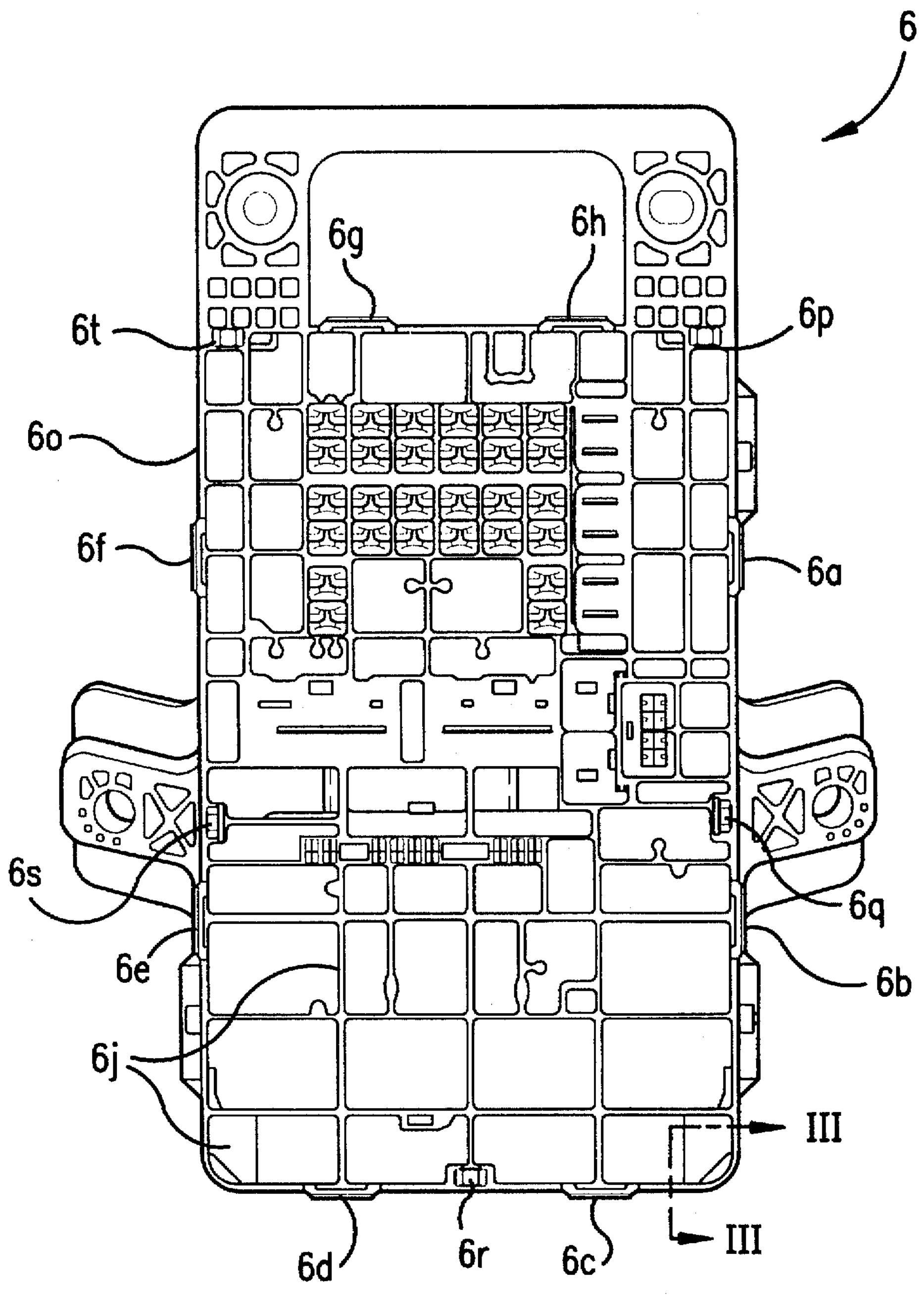
FIG. 1 shows a bottom view of the upper case of the electric junction box of the present invention.
Figure 2A:
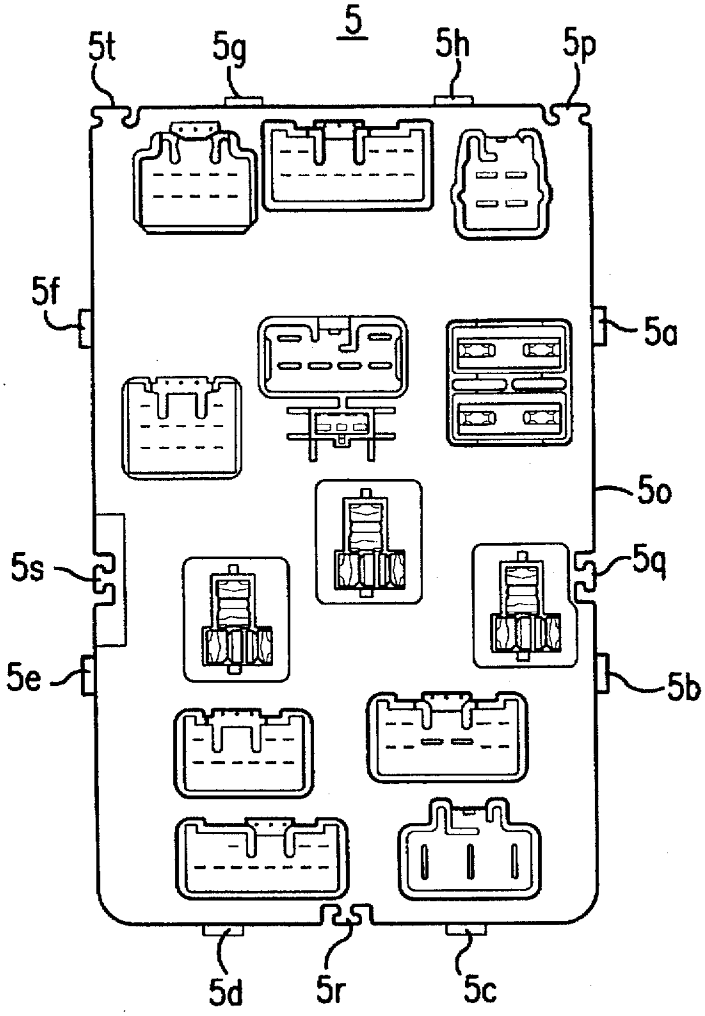
FIG. 2(A) shows a bottom view on the lower case of the electric junction box of the present invention.
Figure 2B:
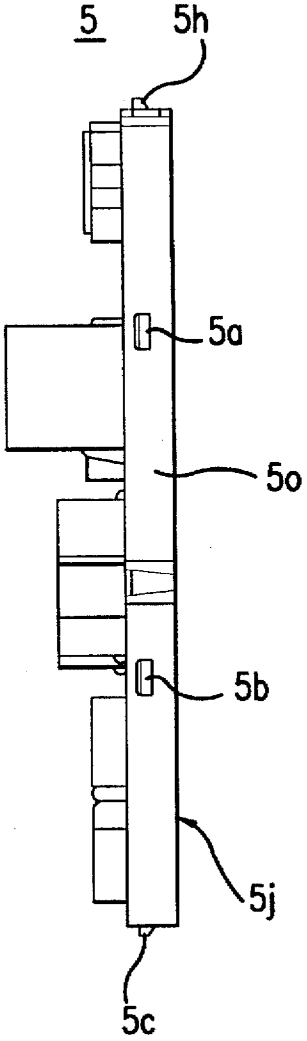
FIG. 2(B) shows a side view thereof.
Figure 4:
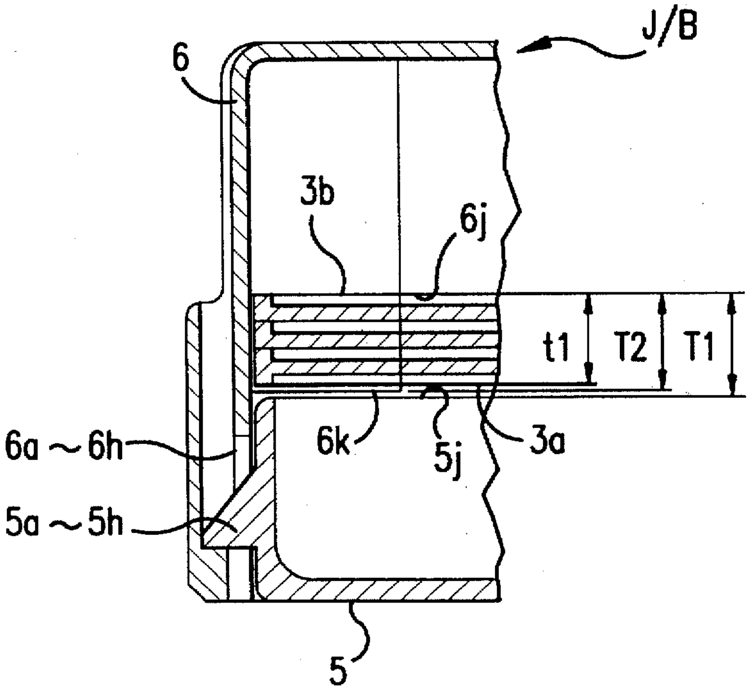
FIG. 4 shows a sectional view of a position similar to FIG. 3 when the upper case and the lower case are fixedly locked.
Figure 5A:
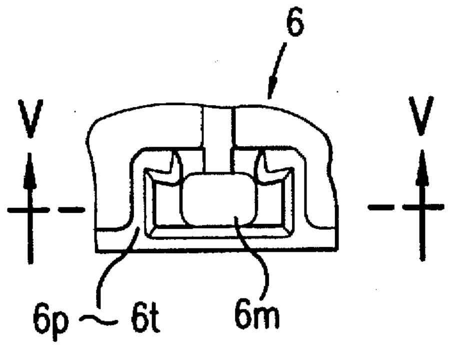
FIG. 5(A) shows a bottom view illustrating a rib for preventing deflected opening in an upper case side.
Figure 5B:
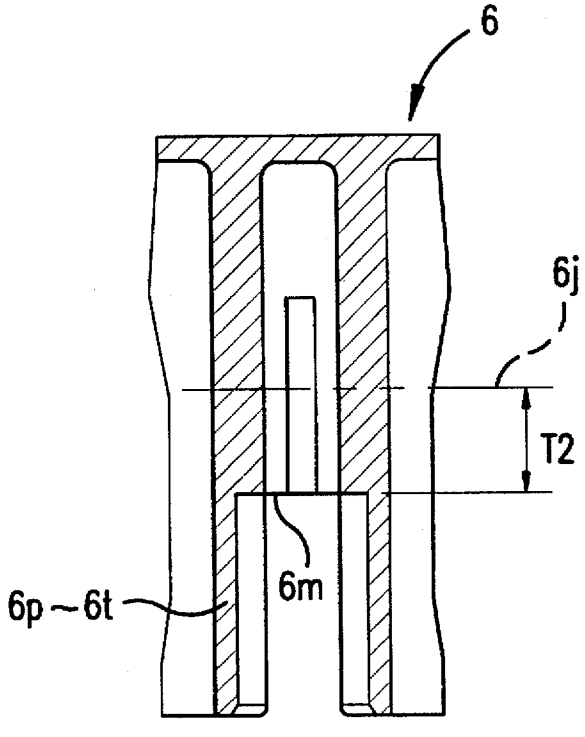
FIG. 5(B) shows a sectional view V—V of FIG. 5(A)

As shown in FIGS. 2(A) and 2(B), a lower case of an electric junction box J/B includes, for example, eight connecting claws 5*a*–5*h*. Two sets of claws are installed along each side surface of an external surrounding wall 50 of the lower case 5 of the electric junction box J/B. As shown in FIG. 1, a total of eight connecting holes 6*a*–6*h* are provided on an external surrounding wall 60 of an upper case 6 to correspond with respective connecting claws 5*a*–5*h* of the lower case 5. With the lower case 5 and upper case 6 as shown in FIG. 4, the upper case 6 covers the lower case 5, which connects the connecting hole 6*a* on the upper case 6 with the connecting claw 5*a* on lower case 5. In the same manner, claw 5*b* is connected with hole 6*b*, claw 5*c* with hole 6*c*, etc., each of which is connected and then locked.

Figure 6:
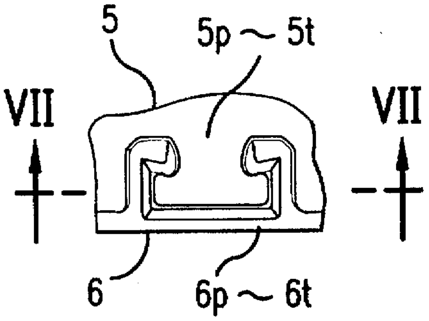
FIG. 6 shows a bottom view of a condition of the protrusion interfitting the lower case onto the rib for preventing the deflected opening.
Figure 8:
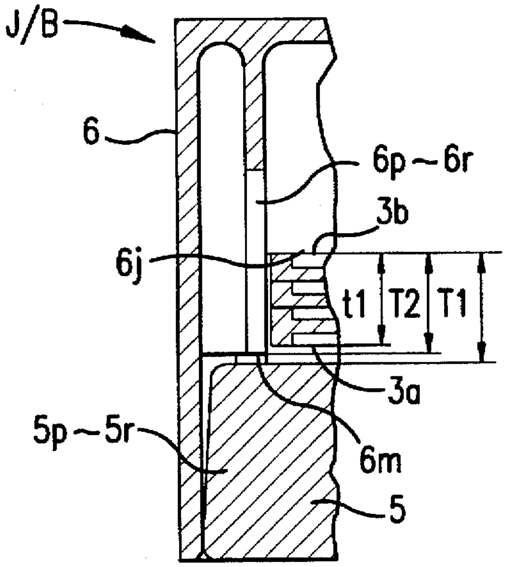
FIG. 8 shows a sectional view VIII—VIII of FIG. 7.
Figure 7:
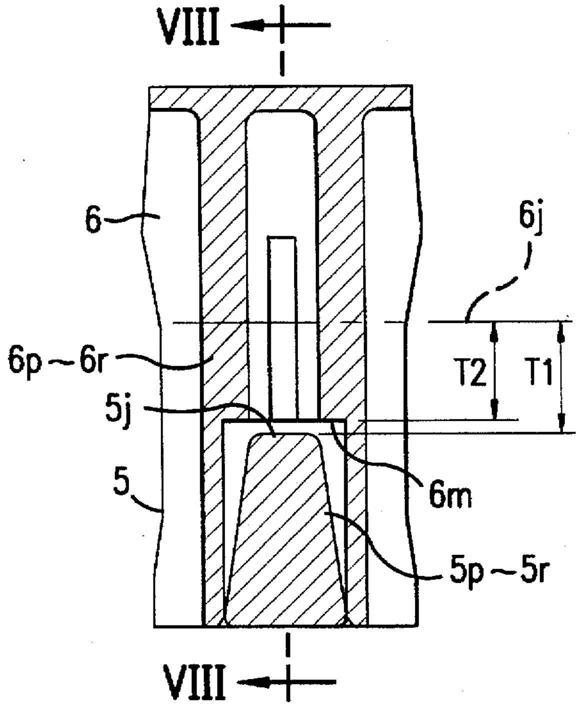
FIG. 7 shows a sectional view VII—VII of FIG. 6.
Figure 9:
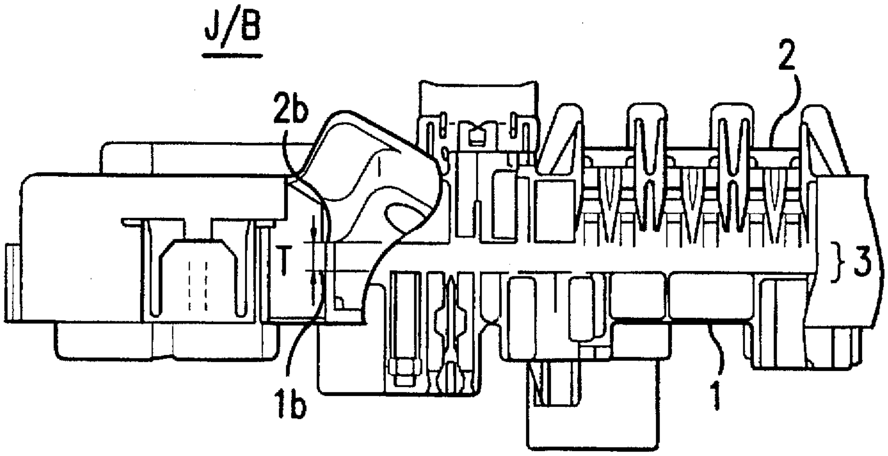
FIG.9 PRIOR ART
FIG. 9 shows a partial sectional view of a conventional electric junction box.
Figure 10:
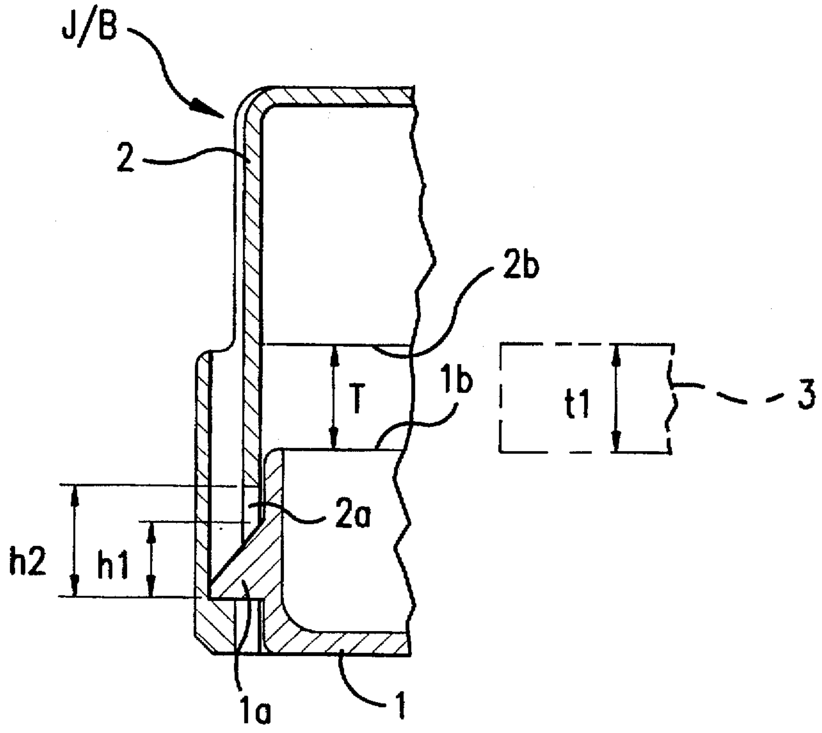
FIG.10 PRIOR ART
FIG. 10 shows a schematic view of a bus bar housing area of the conventional electric junction box.

Furthermore, as shown in FIG. 2, for example, a total of five T-shaped protrusions 5*p*–5*t* for preventing deflected opening are provided on each surface and corner of the exterior surrounding wall 50 on the lower case 5. In addition, as shown in FIG. 1, a total of five T-shaped ribs 6*p*–6*t* for preventing deflected opening are provided on the external surrounding wall 60 on the upper case 6 in registry with each protrusion 5*p*–5*t* on the lower case 5. The protrusions 5*p*–5*t* for preventing deflected opening and ribs 6*p*–6*t* for preventing deflected opening are designed to prevent the deflected opening of the external surrounding wall 60 of the upper case 6 by covering a rib 6*p* on the upper case 6 onto a protrusion 5*p* on the lower case 5 when covering the upper case 6 over the protrusion 5*p* of lower case 5, with the same manner for rib/protrusion combinations 5*q*–6*q*, 5*r*–6*r*, etc. as shown in FIGS. 6–8.

As shown in FIG. 2(B), the entire upper surface on the lower case 5 becomes a flat holding area 5*j* that holds a lower surface 3*a* of bus bar laminate 3. Also, as shown in FIG. 1, the lower end surface of a frame provided properly on the inside of upper case 6 becomes a holding surface 6*j* that holds an upper surface 3*b* of the bus bar laminate 3. Each of these holding surfaces 5*j* and 6*j* is so designed that a slight clearance (for example, about 0.5 mm) for a thickness t1 of bus bar clearance 3 becomes a holding distance T1 to avoid a gap which bears movement in a covering direction (i.e. up and down directions). The bus bar laminate 3 is incorporated in the inside of both cases 5 and 6 when the connecting holes 6*a*–6*h* are connected on the connecting claws 5*a*–5*h* and locked with the upper case 6 covered on the lower case 5.

Figure 3:
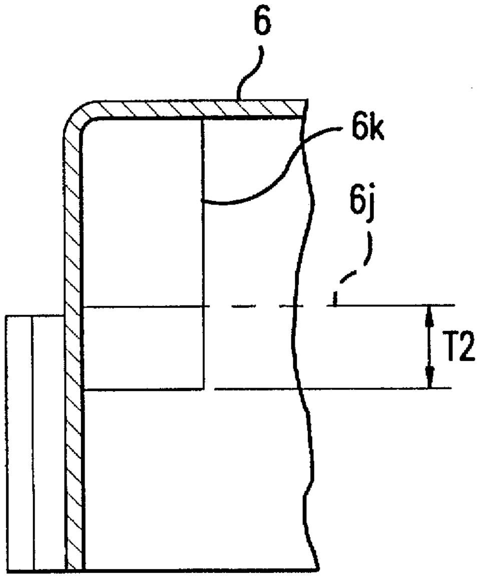
FIG. 3 shows a sectional view III—III in FIG. 1.

As shown in FIG. 3, on two corners on a lower side of the inside of the upper case 6, a first seating 6*k* is provided that connects a holding surface 5*j* of the lower case 5 when both cases 5 and 6 are covered and locked as shown in FIGS. 3 and 4. The first seating 6*k* sets a height T2 from the holding surface 6*j* with the same distance as T1 between the holding surfaces 5*j* and 6*j* (or slightly shorter), and also sets a height slightly larger than a thickness t1 of the bus bar laminate 3 ($T1 \geqq T2 > t1$).

Likewise, a second seating 6*m* for connecting the holding surface 5*j* on the lower case 5 is provided to use together with each of the ribs 6*p*–6*t* when covering and locking both cases 5 and 6 as shown in FIGS. 5(A), 5(B), and 6–8. With regard to the second seating 6*m*, in the same manner as the first seating 6*k*, a height T2 from the holding surface 6*j* is set with a distance equal to a distance T1 (or slightly shorter, and slightly larger than a thickness t1 ($T1 \geqq T2 > t1$).

As mentioned above, with a structure provided with the first seating 6*k* and the second seating 6*m*, when pressing the upper case 6 in a covering direction for locking the connecting claws 5*a*–5*h* and connecting holes 6*a*–6*h* by covering the upper case 6 onto the lower case 5, each first seating 6*k* and second seating 6*m* connect with the holding area 5*j* of lower case 5 when both case 5 and 6 are locked. Therefore, the upper case 6 will not move in a covering direction, or to a direction of a lower case side by more than a thickness t1 of the bus bar laminate 3. Therefore, possible deformation of bus bar or damage of base material will not occur, because unnecessary load will not be applied owing to direct pressing of the holding surface 6*j* on the upper case 6 to the bus bar laminate 3.

In the above-mentioned embodiment, since the first and the second seatings 6*k* and 6*m* are provided around the vicinity of respective connecting claws 5*a*–5*h* and connecting holes 6*a*–6*h*, there is no possibility of needless load to the bus bar laminate 3 owing to distortion, etc. of the holding surface 6*j* on the upper case 6 because respective seatings 6*k* and 6*m* will contact the holding surface 5*j* on the lower case 5 at a position where the greatest force is given when covering the upper case 6 in a covering direction.

Furthermore, because the seatings 6*k* and 6*m* are provided on four corners of upper case 6, pressing with the upper case upon the bus bar laminate 3 can be avoided when covering in a covering direction by giving pressure onto 4 corners of the upper case 6. In addition, because the second seating 6*m* is used together with ribs 6*p*–6*t* for preventing deflected opening of the external surrounding wall 60 on the upper case, it is compact.

With the above-mentioned embodiment, the lower case 5 is covered and interfitted with the upper case 6, but covering the upper case 6 with the lower case 5 and then interfitting is also preferred. In such a case, the connecting claws are provided on the upper case 6 while the connecting holes are provided on the lower case 5.

In addition, although respective seatings 6*k* and 6*m* are provided by protruding downward from the inner face of the upper case 6, providing them by protruding upward from the inner face of the lower case 5 is also preferred. That is, it is also acceptable to protrude the seatings upwards with a dimension a little larger than the thickness of bus bar laminate from the holding surface of lower case, thus making contact with the holding face of the upper case.

As is apparent from the description above, with the electric junction box of the present invention, when inserting one case for locking in a covering direction with another case, because the seating contacts a holding face of opposite case, moving the case becomes difficult for the insertion up to a distance larger than the thickness of bus bar laminate. Therefore, no unwanted load is applied to the bus bar laminate by pushing the case, thereby surely preventing the generation of deformation of the bus bar and damages of base material. As a consequence, a proportion of defective units during production and assembling is reduced, thereby improving quality.

As described, if a seating is provided in the vicinity of connecting claws and connecting holes, when pushing one case in a covering direction, because the seating will contact a holding face on the opposite case at a position where a force is primarily directed, pressing the case in a covering side is avoided, which prevents the application of an unnecessary load to the bus bar laminate.

As described, if the seating is provided at least on four corners when forces are applied to four corners of either case for inserting in a covering direction, pressing the bus bar with the case at an insertion area can be avoided in advance.

As described, when the seating is used together with a rib for preventing deflected opening of the external surrounding wall on either case, no special space is required for seating, which is advantageous for space saving.

The invention has been described in detail with reference to preferred embodiments thereof, which are intended to be illustrative, not limiting. Various modifications and changes can be made without departing from the spirit and scope of the invention as defined in the appended claims.

What is claimed is:

1. An electric junction box comprising:

an upper case;

a lower case attachable to the upper case;

a bus bar laminate interfitting between the upper case and the lower case; and at least one seating protruding from at least one of the upper and lower cases, wherein a distance from a first holding surface of one of the upper and lower cases to said at least one seating is set to be slightly larger than a thickness of the bus bar laminate and is substantially equal to a dimension between the first holding surface and a second holding surface opposite the first holding surface, and wherein said at least one seating is made to contact one of the first and second holding surfaces and is restricted so that the upper and lower cases are not forced to move in a pressing direction against the bus bar laminate.

2. The electric junction box as set forth in claim 1, wherein each said seating is provided in a region of a connecting claw and a connecting hole.

3. The electric junction box as set forth in claim 1, wherein said at least one seating comprises a plurality of seatings formed one on each of four corners of either of the upper and lower cases.

4. The electric junction box as set forth in claim 1, wherein said at least one seating also serves as a rib for preventing deflected opening of an external surrounding wall of at least one of the upper and lower cases.

5. An electric junction box comprising:

a lower case having a lower holding surface;

an upper case attachable to the lower case using a predetermined force, said upper case having an upper holding surface;

a bus bar laminate positioned between the upper holding surface and the lower holding surface; and means for maintaining a predetermined distance no less than a thickness of said bus bar laminate between the upper holding surface and the lower holding surface despite application of said predetermined force, said means for maintaining said predetermined distance including at least one seating protruding from at least one of the upper and lower cases, wherein a distance between said seating and an opposed one of said upper and lower holding surfaces is slightly larger than said thickness of the bus bar laminate and substantially equal to a dimension between the upper and lower holding surfaces.

6. The electric junction box as set forth in claim 5, wherein said at least one seating is provided in a region of a matched connecting claw provided on a peripheral portion of one of the cases and a connecting hole provided on a peripheral portion of the other of the cases.

7. The electric junction box as set forth in claim 5, wherein said one seating comprises a plurality of seatings formed one on each of four corners of either of the upper and lower cases.

8. The electric junction box as set forth in claim 5, wherein said at least one seating also serves as a rib for preventing deflected opening of an external surrounding wall of at least one of the upper and lower cases.

9. The electric junction box according to claim 5, wherein one of said upper case and said lower case includes a plurality of claws and the other of the upper case and the lower case includes a plurality of connecting holes corresponding to said claws.

10. The electric junction box according to claim 9, wherein one of said claws and one of said connecting holes are provided adjacent one of said at least one seating.

11. A method for assembling a junction box incorporating a bus bar laminate, comprising:

inserting a bus bar laminate between an upper case and a lower case of the junction box;

pressing the upper and lower cases together using a predetermined force to sandwich said bus bar laminate;

maintaining a predetermined distance between an upper holding surface of the upper case and a lower holding surface of the lower case that is no less than a thickness of the bus bar laminate; and providing one of the upper and lower cases with T-shaped protrusions and the other of the upper and lower cases with T-shaped indentations for preventing deflected opening of the upper and lower cases.

12. The method according to claim 11, further comprising locking the upper and lower cases together with the bus bar laminate therebetween while maintaining said predetermined distance.

13. The method according to claim 11, further comprising providing at least one seating on one of said upper and lower cases to maintain said predetermined distance.

14. The method according to claim 13, wherein the junction box is substantially rectangular, and the step of providing at least one seating comprises providing a seating on each of a plurality of corners of either of the upper and lower cases.

* * * * *